March 7, 1967  W. B. GOGARTY ETAL  3,307,567
METHOD AND APPARATUS RELATING TO
PIPELINE TRANSPORT OF FLUIDS
Filed April 23, 1964

INVENTORS
WILLIAM B. GOGARTY
CLAUDE P. COPPEL
BY  GEORGE W. DITRICK

ATTORNEY

United States Patent Office 3,307,567
Patented Mar. 7, 1967

3,307,567
METHOD AND APPARATUS RELATING TO
PIPELINE TRANSPORT OF FLUIDS
William B. Gogarty, Littleton, Colo., Claude P. Coppel,
Woburn, Mass., and George W. Ditrick, Littleton, Colo.,
assignors to Marathon Oil Company, Findlay, Ohio, a
corporation of Ohio
Filed Apr. 23, 1964, Ser. No. 362,096
12 Claims. (Cl. 137—13)

This application is a continuation-in-part of United States patent application Serial No. 134,183, filed August 28, 1961, and now abandoned.

This invention relates to pipelines and more particularly to a method and an apparatus for maintaining a substantially continuous, microscopic film of lubricating fluid between a hydrocarbon being transported and the walls of the pipe.

Overcoming friction between a high viscosity petroleum product and the walls of a pipeline is a major problem. Water, or aqueous surfactant solutions, have been circumferentially injected into a pipeline to form a layer of water between high viscosity crudes and the pipeline walls. However, water and the surfactant solutions tend to segregate in the bottom of the pipe because of their greater density. It has been proposed to line the pipeline with helical lands or grooves so as to cause the denser fluid to encircle the crude. In this technique, the lubricating material is continuously injected into the line through large holes drilled around the circumference of a section of a pipeline.

An improvement on this injection procedure and device was devised utilizing circumferentially positioned holes or slots, or even a completely circular slot for the injection of water. Water, and some oil, was withdrawn through similar openings at booster pumps, etc. The removal of the water and a portion of the oil at pumping stations was required because passage of the aqueous lubricant through the pumps would emulsify the water and the crude, thereby making it unacceptable to refiners without further dehydration of the product.

It has also been found that a lubricant layer formed by placing a microporous sintered liner along the entire length of a pipeline can be utilized for some purposes. While this technique is effective for relatively short lines, such as those used for in-plant transport of molten glass, it is inoperative for petroleum pipeline usage because of the length of these lines. In pipeline operations, a lubricant pressure must be maintained along the entire pipeline, through the injection liner, which is greater than the pressure exerted by the crude within the liner. The problem of differential pressure maintenance between the fluids of differing viscosities is aggravated at bends in the pipes, where centrifugal forces come into play, tending to cause the crude to force its way through the microporous injector liner into the area reserved for lubricant. Another problem inherent in present pipeline injection techniques with their minimum pressure control is the injection of excessive water at the bottom of the pipeline, thereby necessitating the injection of amounts of water which render the petroleum product unacceptable to refiners without further dehydration of the product.

We have now invented a relatively inexpensive pipeline injection system which allows injection of aqueous films of substantial uniformity and which overcomes the problems of pressure control necessary to maintain substantially uniform films along the pipeline without allowing crude penetration through the foraminous injector liner. Furthermore, our invention allows better injectivity control from the top to the bottom of the pipeline.

Essentially, our invention is a petroleum product pipeline having lubricant injection through only a minor portion of a petroleum pipeline. In a preferred form, a plurality of injectors are present between pumping stations and other areas where large amounts of mixing take place.

The term "water lubricant" is intended to include water and water solutions containing surfactants and cosurfactants. The term "petroleum products" is intended to include crude, fuel oil, reformer bottoms, and other high viscosity petroleum products which are substantially immiscible with and insoluble in the water lubricants. Preferably, the petroleum product and water lubricant have approximately the same density. The water lubricant should, of course, be free of solid particles so as to prevent fouling of the microforaminous injector.

Our invention is more fully set out in the following paragraphs with reference to the attached drawings in which.

Figure 4:
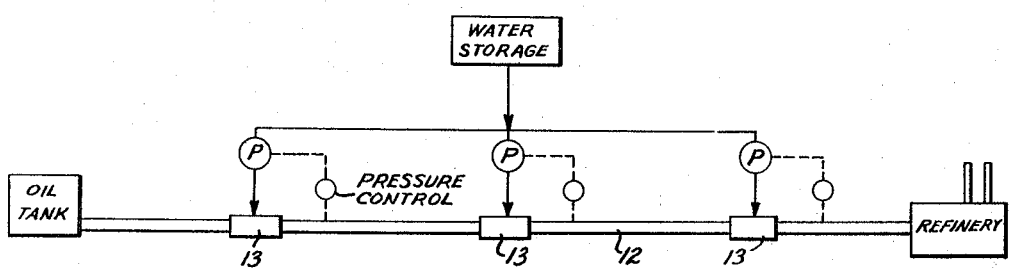

FIGURE 4 schematically depicts a portion of a pipeline utilizing applicants' invention. The same identifying numbers are used for all figures.

Figure 1:
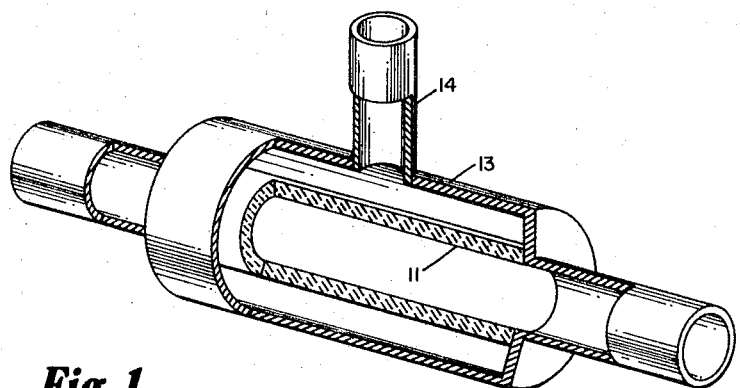
FIGURE 1 is a partially cutaway injector disclosing the arrangement of the various parts of the injector.

The injector of FIG. 1 is made up of a microscopically porous liner, 11, having substantially the same inside diameter as pipeline 12; housing 13; and at least one water lubricant inlet 14.

Liner 11 can be made up of any material which contains microscopic channels; i.e., less than about 0.01 inch, and preferably about 0.005 inch, and which is insoluble in both the petroleum product and water lubricant. Liners made of sintered metal powders, such as bronze or steel powders, and various porous ceramic materials—for example, alumina—are useful in our invention. These liners can be of any thickness necessary, depending on permeability, etc., to achieve a desired pressure drop. The holes in liner 11 are of microscopic size as it is essential to our process that the pressure drop across liner 11 be greater than the pressure difference caused by gravity from the bottom of the pipeline to the top. These pressures can be appreciable. For example, in a 30-inch pipeline where the flowing fluid is under a pressure of 625 p.s.i., this hydrostatic pressure difference amounts to 1.1 p.s.i. Preferably, the pressure drop across liner 11 will be from about 2 to about 50 p.s.i. In any event, it should be on the order of at least 25 p.s.i. greater than the pressure drop caused by gravity from the bottom to the top of the pipeline. The effects of gravity are negated by using this injection method, even where the pipeline is in an oblique inclination.

Figure 2:
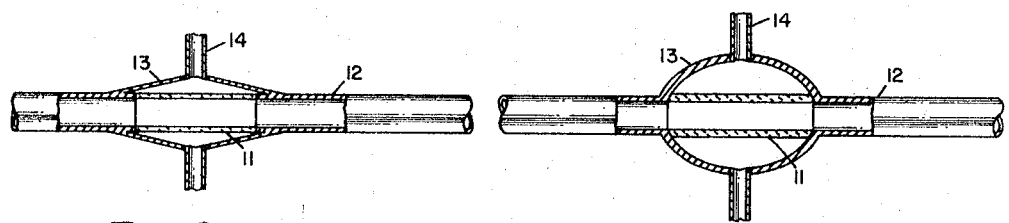
FIGURES 2 and 3 depict two of a series of injectors set at predetermined intervals along a pipeline, the injectors being cutaway to depict the relationship between the pipeline and the injector parts.
Figure 3:
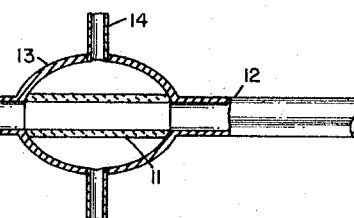

Liner 11 and housing 13 form a water lubricant-tight chamber, which, though shown in FIG. 1 to be of cylindrical form, can be of any desired configuration. Two other configurations are depicted in FIG. 2.

The liner length varies with liner permeability, injection pressures, crude flow rate and pipeline diameter. Preferably, the liner is sufficiently long to supply the necessary microscopic film without the use of injection pressures sufficient to force droplets of the water lubricant into the petroleum product being transported or to cause substantial agitation at the injection point. While it is preferred that a complete film be formed, a substantially complete film is acceptable for many purposes.

The length of each liner 11 should be at least about 6 inches and is preferably on the order of 1 to 3 feet. The total injection area through liners 11 is very small with respect to the total internal wall area of the pipeline. Injectors need be placed every tenth of a mile or so and can be 0.2–0.3 mile apart. Thus, it is seen that injector areas of as little as 0.1–0.3% of the pipeline are sufficient for depositing a substantially complete film of water on the petroleum product.

Injection of water lubricant through liner 11 should be continuous while petroleum products are flowing in the pipeline. The crude, or other petroleum product, flowing in line 12 "wipes" the emerging microscopic bubbles from liner 11. The pressure of the emerging water lubricant need be only 0.01–0.1% greater than the petroleum product pressure at the injector. However, greater or lesser pressures can be utilized. The pressure of water lubricant in the chamber should be substantially uniform during the period particular petroleum product is flowing in the line.

In carrying out our preferred process, a number of injectors are periodically inserted along the pipeline between pumping stations and other points where injection would normally take place because of destruction of the previous water film by mixing.

Injectors 15 in FIG. 4 are of the embodiment of FIG. 2. Oil from source 16 is conveyed along pipeline 12 by pump 17. Water from source 19 is forced into pipeline 12 at pressures predetermined for each point by pumps 18. The distance required between injectors 15 will vary with the roughness of the interior of the pipeline, the absence or presence of a particular surfactant in the water lubricant, surfactant concentration in the water lubricant, petroleum product flow rate, lubricant pressures, etc. We prefer to utilize the water lubricants described in copending United States patent application Serial No. 242,360, by Claude P. Coppel and Hendrik K. van Poollen, filed on December 5, 1962, now abandoned.

Now having described our invention, what we claim is:

1. In a method for lubricanting a petroleum product flowing in a petroleum product pipeline wherein water lubricant is injected in the said pipeline through microscopic channels in an injector to form a substantially continuous microscopic film of water lubricant between the inner wall area of the pipeline and the petroleum product which is flowing within the pipeline under pressure, the improvement comprising simultaneously injecting water lubricant into the pipeline through a plurality of circumferential microporous injectors spaced at substantial intervals and maintaining the fluid pressure drop from the outside wall of the injector to the inside wall of the injector greater than the pressure drop from the top of the pipeline to the bottom of the pipeline and maintaining a pressure on the water lubricant sufficient to introduce water lubricant into said pipeline in amounts sufficient to maintain only a microscopic lubricant film from one injector to the next injector without substantial buildup in lubricant film thickness along substantial distances of pipeline.

2. The process of claim 1 wherein water lubricant is injected into said pipeline through an injector area which is minor with respect to the total pipeline inner wall area.

3. The process of claim 2 wherein the injector area comprises 0.1–0.3% of the total pipeline inner wall area.

4. The process of claim 1 wherein the pressure of the injected water lubricant exceeds the petroleum produced pressure by 0.01–0.1%.

5. The process of claim 1 wherein the water lubricant is injected through a plurality of injection areas.

6. The process of claim 1 wherein the pressure drop across the microscopic channels of the injector area is between 2 to 50 p.s.i.

7. The process of claim 6 wherein the pressure drop across the microscopic channels of the injector area is about 25 p.s.i.g.

8. A pipeline comprising a major portion of a nonporous pipe, means for pumping petroleum product, means for maintaining pressure on a water lubricant, and a plurality of injector means comprising a minor portion of the pipeline, said injector means having a water-tight housing connected to a source of water lubricant under pressure and a microporous liner of substantially the diameter of the nonporous pipe and coextensive with and enveloped by said housing, said liner having microscopic channels around the circumference thereof and adapted to induce a substantial drop in the pressure on the water lubricant flowing therethrough, said drop in pressure being greater than the drop in pressure from the top to the bottom of the pipeline.

9. The pipeline of claim 8 wherein the injector area comprises 0.1–0.3% of the total pipeline inner wall area.

10. The pipeline of claim 8 wherein said plurality of injector means are maintained in said pipeline between means for pumping petroleum product.

11. The pipeline of claim 8 wherein the miscroscopic channels have average cross sections of less than about 0.1 inch.

12. The pipeline of claim 8 wherein the microscopic channels have an average cross section of about 0.005 inch.

References Cited by the Examiner

UNITED STATES PATENTS

| 759,374 | 5/1904 | Isaacs et al. | 137—13 |
| 2,821,205 | 1/1958 | Chilton et al. | 137—13 |
| 3,040,760 | 6/1962 | Macks | 137—13 |

LAVERNE D. GEIGER, *Primary Examiner.*

H. S. BELL, *Assistant Examiner.*